United States Patent [19]

Auerswald

[11] Patent Number: 4,820,421
[45] Date of Patent: Apr. 11, 1989

[54] SYSTEM AND METHOD FOR DEMINERALIZING WATER

[76] Inventor: David C. Auerswald, 908 Firmona Ave., Redondo Beach, Calif. 90278

[21] Appl. No.: 45,079

[22] Filed: May 1, 1987

[51] Int. Cl.$^4$ ................................................ C02F 1/42
[52] U.S. Cl. .................................... 210/670; 210/674; 210/685
[58] Field of Search ............... 210/670, 685, 686, 900, 210/674

[56] References Cited

U.S. PATENT DOCUMENTS

| | | | |
|---|---|---|---|
| 2,267,841 | 12/1941 | Riley | 210/24 |
| 2,962,438 | 11/1960 | Smith | 210/37 |
| 3,382,169 | 5/1968 | Thompson | 210/685 |
| 3,536,637 | 10/1970 | Noll et al. | 260/2.2 |
| 3,663,163 | 5/1972 | De Pree et al. | 23/63 |
| 3,679,580 | 7/1972 | Boari et al. | 210/26 |
| 3,700,592 | 10/1972 | DePree | 210/33 |
| 3,849,306 | 11/1974 | Anderson | 210/38 |
| 3,870,033 | 3/1975 | Faylor et al. | 126/360 R |
| 3,985,648 | 10/1976 | Casolo | 210/686 |
| 4,116,860 | 9/1978 | Kunin | 252/192 |
| 4,280,912 | 7/1981 | Barry, III et al. | 210/662 |
| 4,336,140 | 6/1982 | Smith et al. | 210/677 |
| 4,622,133 | 11/1986 | Furuno | 210/96.2 |

OTHER PUBLICATIONS

Auerswald, Ultrapure Water, pp. 38–47, (Jan./Feb. 1986).
Kunin et al., The Use of Weakly Acidic Cation Exchange Resins in Condensate Polishing, EPRI Condensate Polishing Workshop, (1983).
Smith, Modern Countercurrent Ion Exchange Plants and the Hipol TM Process, Society of Chemical Industry Advances in Ion Exchange Water Treatment Conference-Apr. 3, 1980, Bristol University.

*Primary Examiner*—Ivars Cintins
*Attorney, Agent, or Firm*—Sheldon & Mak

[57] ABSTRACT

Water is demineralized by passage through a water demineralization system. The water demineralization system comprises a series of at least three ion exchange resin zones. The sequential series comprises a strong acid cation (SAC) resin zone, a first anion resin zone, and a weak acid cation (WAC) resin zone. The SAC resin zone comprises a SAC resin for removing cations from the water, the first anion resin zone comprises an anion resin for removing anions from the water, and the WAC resin zone comprises a WAC resin for removing cations from water without substantially splitting any salts present in the water. Means for connecting each resin zone in the series are provided so that water can pass sequentially through the system. A method is also provided for regenerating the WAC resin from sodium and ammonium exhaustants. This method comprises contacting the WAC resin with an aqueous solution of a regenerant that is substantially devoid of sulfur and halogen groups. The regenerant is selected from the group consisting of (a) organic acids, (b) inorganic acids, (c) amine salts of (a) and (b), (d) amines, and (e) combinations thereof.

40 Claims, 1 Drawing Sheet

SYSTEM AND METHOD FOR DEMINERALIZING WATER

BACKGROUND

The present invention is directed to a system and method for demineralizing water using ion exchange resins.

A power plant normally employs two types of water demineralization systems, namely, a condensate polishing system and a make up demineralization system. The condensate polishing system further demineralizes condensate water from a steam condenser. Condensate water is already of low solids content, e.g., normally having a total dissolved solids content below 5 parts per million (ppm). Traditional condensate polishing process can produce water having a final dissolved solids content level of about 5 to about 50 parts per billion (ppb). Condensate water that has been polished is used, substantially undiluted, in a power plant operating system. By further reducing the total dissolved solids content of water, condensate polishing processes help prevent corrosion to the power plant operating system.

Ion exchange processes were initially developed for the demineralization of water containing relatively high dissolved solids contents, i.e., above about 20 ppm. Mixed bed systems, in which the bed is a mixture of anion exchange and cation exchange resins, were long ago accepted as being advantageous for polishing condensate.

A mixed bed employed in condensate polishing processes typically comprises a mixture of strong base anion (SBA) and strong acid cation (SAC) exchange resins. These mixed bed systems are generally regenerated to reuse the resins and thereby reduce their operating costs. A strong acid, e.g., sulfuric or hydrochloric acid, is used to regenerate the SAC resin and caustic is used to regenerate the SBA resin.

There are problems with the use of mixed bed systems in condensate polishing processes. One of the most significant problems is that the SBA and SAC resins cannot be totally separated. Therefore, part of the SBA resin ends up contacting either the sulfuric or hydrochloric acid used to regenerate the SAC resin and is thereby put in the (a) sulfate or bisulfate or (b) chloride form, respectively. Similarly, part of the SAC resin contacts the caustic used to regenerate the SBA resin thereby putting the SAC resin into the sodium form. When the regenerated SAC and SBA resins are returned to the mixed bed and the mixed bed is put back into service, the SBA resins that were put in the sulfate or chloride form and the SAC resins that were put in the sodium form leak (a) sulfate or chloride and (b) sodium, respectively, from the mixed bed. This leakage, which is in the low ppb range, increases the total dissolved content of the effluent water and can also increase the effluent water's corrosion potential. Both of these adverse results can contribute to corrosion of a power plant operating system.

The mixed bed systems employed as polishers typically also suffer from poor "kinetics". Kinetics is the rate or speed at which contaminates are adsorbed onto a resin, and thereby removed from the water, at a given flow rate of water. Futhermore, the mixed bed systems require frequent regenerations when an influent to the mixed bed has a high sodium level or chloride, e.g., due to a leak in a steam condenser, or a high ammonia level due to the feed of ammonium and hydrazide into the cycle. In addition, current water polishing systems yield effluent water which possesses an unacceptably high corrosion potential. Each of these deficiencies adversely impacts the utilities operating costs.

An additional problem that mixed bed systems suffer from is that the SAC resin has some level of sulfonates constantly being leached out from the SAC resin and onto the SBA resin. Because the SBA resin's ability to adsorb sulfonates is very low and because the amount of SBA resin downstream from particular SAC resin particles varies in the mixed bed system, the sulfonates eventually leak into the effluent water from the mixed bed. The leaked sulfonates, under the high temperatures of a boiler system, break down creating sulfates which are very corrosive to a power plant operating system.

A number of efforts have been made to alleviate these problems. However, none of the previously proposed solutions satisfactorily address all these problems.

With respect to the make up demineralization system, this system demineralizes water being brought into a power plant to make up for water lost during the power plant operating cycle. Water brought into the power plant normally has a total dissolved solids content of above 10 ppm. For example, this water can be potable water. Since less than about two percent of the water employed in power plant operating cycle is make up water, make up demineralization systems, because of cost considerations, do not produce water having as low a dissolved solids content as water treated by condensate polishing systems.

Make up demineralization systems consist of two sections. The first section is for primary water treatment and the second section is for polishing effluent water from the primary water treatment section. Each section can consist of one or more ion exchange resin beds or zones. The ion exchange beds employed in the primary water treatment section generally have a larger cross-sectional area and a deeper depth than the ion exchange beds employed in the water polishing section. Effluent water from the primary water treatment section of the make up demineralization system normally has a dissolved solids content of below 10 ppm. The polishing section of the make up demineralization system traditionally produces water having a final dissolved solids content level as high as 50 ppb.

Typically, sodium is the predominant mineral in the effluent water from the make up demineralization system. Due to operating cost considerations, this final dissolved solids content is no longer satisfactory. Although efforts have been made to lower the final dissolved solids content level of the treated make up water, none of the previously proposed solutions has satisfactorily solved the problem.

Accordingly, there is a need for a system and process for polishing condensate water that are capable of producing water having a purity comparable to or better than that currently obtainable but which are devoid of the problems characteristic of current polishing systems and processes. These problems include (a) unacceptably high sulfonate, chloride, and/or sulfate leakage in the effluent water, (b) poor kinetics, (c) frequent resin regeneration requirements, (d) cross contamination of resins during regeneration procedures, and (e) undesirably high corrosion potential of the effluent water. In addition, there is a need for a make up demineralization system and process for demineralizing make up water that is capable of economically yielding an effluent water having a sodium content of less than about 5 ppb and a total dissolved solids content of less than about 10 ppb.

SUMMARY

The present invention satisfies these needs by providing (a) a system and (b) method for demineralizing water as well as (c) a method for regenerating a weak acid cation resin. According to this invention, the system comprises (a) a series of at least three ion exchange resin zones for removing ions from the water and (b) means for connecting each resin zone in the series so that water can pass sequentially therethrough.

More particularly, the series sequentially comprises a strong acid cation (SAC) resin zone, a first anion resin zone, and a weak acid cation (WAC) resin zone. The SAC resin zone comprises a SAC resin. SAC resins are capable of removing at least about 95 percent of the cations from the influent water and converting the salts in the influent water to acids. The first anion resin zone comprises an anion resin for removing anions (now in acid form) from water passing through the system. The WAC resin zone comprises a WAC resin for removing cations from water (predominantly sodium from the first anion resin zone effluent) without substantially splitting any salts present in the water.

When the first anion zone comprises a strong base anion (SBA) resin, the series comprising the SAC, SBA, and WAC resin zones can serve as a condensate polisher. The presence of the WAC resin in the WAC resin zone of the water polisher enables the condensate polisher to produce effluent water having an acceptable corrosion potential. In addition this configuration of resin zones (a) reduces the sulfonate leakage from the condensate polisher, (b) improves the system's kinetics, and (c) eliminates cross contamination of the resins during the regeneration step. The WAC resin regeneration process of the present invention also reduces the chloride and sulfate leakage from the condensate polisher.

The water demineralization system of the present invention can also be employed as a make up demineralization system to demineralize water brought into the power plant operating system to compensate or make up for water lost during operation of the power plant. In a first make up demineralization system embodying features of the present invention, the first anion resin zone comprises an anion resin selected from the group consisting of weak base anion resins and mixtures of weak base anion resins and strong base anion resins. In this embodiment of the make up demineralization system, the cation and first anion resin zones are primary water demineralization zones and the weak acid cation resin zone is a water polishing zone.

In a second make up demineralization system embodying features of the present invention, the system further comprises a second anion resin zone between the SAC resin zone and the first resin zone. In this embodiment of the make up demineralization system, the first anion resin zone comprises a SBA resin and the second anion can either comprise an anion resin selected from the group consisting of WBA resins and mixtures of WBA and SBA resins or can comprise a SBA resin. When the second anion resin zone comprises a resin selected from the group consisting of WBA resins and mixtures of WBA and SBA resins, the SAC resin zone, second anion resin zone, and first anion resin zone are primary water demineralization zones and the WAC resin zone is a water polishing zone. Alternatively, when the second anion resin zone comprises a SBA resin, the SAC and second anion resin zones are primary water demineralization zones and the first anion and WAC resin zones are water polishing zones.

In a third make up demineralization system embodying features of the present invention, the first anion resin zone comprises a SBA resin and the system further comprises a primary cation resin zone and a primary anion resin zone. The primary cation and primary anion resin zones are primary water demineralization zones and sequentially precede the SAC, first anion, and WAC resin zones, the latter three zones being water polishing zones. In this embodiment, the primary cation resin zone comprises a cation resin for removing cations from water and the primary anion resin zone comprises an anion resin for removing anions from water.

The resin zones employed in the water demineralization system of the present invention can be housed in either a tower or in separate vessels or in any combination of towers and separate vessels. It is preferred that the depth of the WAC resin in the WAC resin zone be from about 9 to about 48 inches. Below about 9 inches the contact time for satisfactory ion exchange is too short and above about 48 inches the pressure drop across the WAC resin zone is undesirably high.

Water passed through the condensate polisher of the present invention can yield an effluent having a sodium, chloride, and sulfate content of less than about 1,000 parts per trillion (ppt) each and a conductivity of less than about 0.5 $\mu$S/cm at about 25° C. In addition, the condensate polisher system and process of the present invention is capable of producing effluent water having a sodium, chloride, and sulfate content of less than about 100 ppt each. In fact, the effluent water can have a sodium, chloride, and sulfate content of less than about 50 ppt each and a conductivity of less than about 0.07 $\mu$S/cm at about 25° C.

Water passed through the make up demineralization system of the present invention can economically yield an effluent having a sodium, chloride, and sulfate level lower than about 2 ppb each.

As noted above, the corrosion potential of the water demineralization system's effluent water can be reduced by the process of the present invention. This is especially important for condensate polishers. As explained in detail in the Description section, infra, this is accomplished by the use of the WAC resin in the WAC resin zone. One method of reducing the effluent's corrosion potential requires adjusting the concentration of sodium in the effluent water such that it is at least substantially equal to or greater than the combined concentration of chloride and sulfate in the effluent. By so adjusting the ion concentration in the effluent, the effluent is thereby maintained at a substantially neutral to slightly alkaline pH. Water of this pH possesses a reduced corrosion potential.

An exemplary method for manipulating the sodium content of the effluent entails regenerating the WAC resin in the WAC resin zone so that the amount of sodium left on the regenerated WAC resin is less than about 5 percent of the theoretical binding capacity of the WAC resin. More preferably, the amount of sodium left on the regenerated WAC resin is less than about 1 percent of the WAC resin's theoretical binding capacity.

As also noted above, the present invention is capable of reducing chloride and sulfate leakage into the effluent water. To accomplish this aspect of the invention, the WAC resin in the WAC resin zone is regenerated with an aqueous solution of a regenerant that is (a) substantially devoid of sulfur and halogen groups and (b) selected from the group consisting of (i) organic acids, (ii) inorganic acids, (iii) amine salts of (i) and (ii), (iv) amines, and (v) combinations thereof. Exemplary organic acids are aliphatic carboxylic acids (e.g., acetic acid), dicarboxylic acids, hydroxy acids (e.g., citric acid), carbonic acids, carbamic acids, and ethylenediaminetetraacetic acid. Exemplary inorganic acids are phosphoric acid, phosphorous acid, and hypo-boric acid. Exemplary amine salts include, but are not limited to, ammonium citrate, ammonium carbonate, and ammonium bicarbonate. Ammonium bicarbonate can optionally be formed in situ. In addition, the ammonium bicarbonate regenerated WAC resin can be contacted with carbonic acid, thereby putting the WAC resin in the hydrogen form. Exemplary amines are morpholine and amino-2-methyl-2-propanol. In general, the amount of regenerant present in the aqueous regenerating solution is less than about 10 weight percent of the solution.

DRAWINGS

These and other features, aspects, and advantages of the present invention will become better understood with reference to the following description, appended claims, and accompanying drawings where:

DESCRIPTION

The present invention is directed to (a) a system and (b) method for demineralizing water and (c) a method for regenerating a weak acid cation (WAC) resin. The methods and system of this invention are capable of being employed as a condensate polisher and of producing high purity water wherein (a) the effluent water contains low sulfonate, chloride, and sulfate levels, (b) the resins, with only one exception, do not require frequent regenerations, (c) the resins are not cross contaminated during the regeneration process, (d) the system exhibits excellent kinetics, and (e) the effluent water has a low corrosion potential. In addition, the method and system of the present invention are capable of being employed as a make up demineralization system and of producing effluent water having a sodium, chloride, and sulfate content of below about 2 pbb each.

Figure 1:
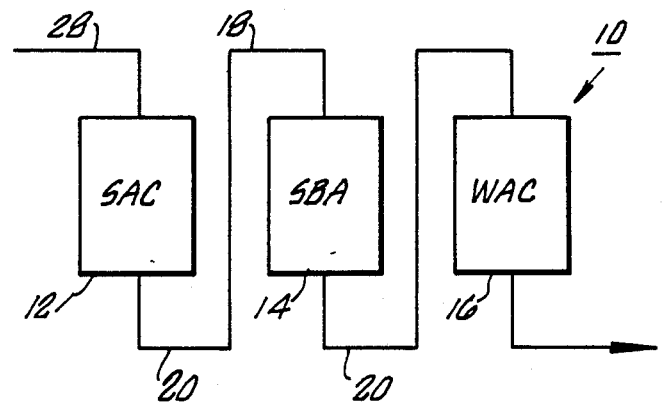
FIG. 1 is a schematic representation of a first water demineralization system embodying features of the present invention and capable of being employed as a condensate polisher.

With reference to FIG. 1, a first water demineralization system 10 embodying features of the present invention, and capable of being employed as a condensate polisher, comprises a strong acid cation (SAC) zone 12, a strong base anion (SBA) zone 14, and a weak acid cation (WAC) zone 16. The SAC resin zone 12 comprises a SAC resin, the SBA resin zone 14 comprises a SBA resin, and the WAC resin zone 16 comprises a WAC resin.

The terms "strong" and "weak" refer to a resin's degree of ionization (or dissociation into ions). A strong resin is a highly ionized resin. A weak resin is a weakly ionized resin.

The strength of acidity or basicity of an ion exchange resin can be determined by titration. Titration measures the change in pH value while a suspension of the ion exchange resin is neutralized through the addition of an alkali or an acid, as appropriate. In the case of the SAC resin, the pH value starts at about 1 and, as alkali is added, increases to about 12. In contrast, when the WAC resin is similarly neutralized, the pH value starts at about 3 and requires much more alkali to reach about 12. When the SBA resin is neutralized with acid, the pH value starts at about 13 and drops under about 2. In contrast, when a weak base anion (WBA) resin is similarly neutralized, the pH value starts at about 8 and requires much more acid to reach about 2.

The SAC resin easily splits salts, converting them to acids. By contrast, the WAC resin cannot readily split salts. In addition, the WAC resin operates efficiently only with waters in the pH range above about 7.

The SBA resins are highly ionized and can operate over the entire pH range. Therefore, the SBA resins can remove both the highly dissociated strong acids (sulfuric and hydrochloric) and the weakly dissociated acids (carbonic and silicic). The WBA resins, on the other hand, are highly ionized in the salt form only and operate only when the pH is below about 7. Being weakly ionized in the base form, the WBA resins have little, if any, salt-splitting capacity. Accordingly, the WBA resins can remove strong acids but not weak acids. For example, WBA resins cannot remove weakly dissociated acids such as carbonic and silicic acids. However, the capacity of the WBA resins to remove the strong acids is much greater than that of the SBA resins.

Exemplary functional groups for WAC, SAC, SBA, and WBA resins are set forth in Table I.

TABLE I

| Resin | Functional Groups |
|---|---|
| WAC | carboxylic |
| SAC | sulfonic |
| SBA | quaternary ammonium |
| WBA | primary, secondary, and/or tertiary amines |

Exemplary SAC resins include, but are not limited to sulfonic polystyrene resins made by sulfonating a copolymer of styrene and divinylbenzene. Exemplary WAC resins include, but are not necessarily limited to, carboxylic resins. Macroporous WAC resins are preferred because of greater resistance to breakage from osmotic shock.

Exemplary SBA resins include, but are not necessarily limited to, Type I and Type II resins. Type I and II resins can be further classified as standard, porous, or macroreticular. Exemplary WBA resins include, but are not necessarily limited to, polystyrene polyamide, phenolic polyamine, epoxy polyamine, acrylic polyamine, and macroreticular tertiary amine resins. In addition, ion exchange resins containing a mixture of weak-base and strong-base groups, typically referred to as "intermediate" resins, can be used in the present invention in place of WBA resins. Accordingly, for purposes of the present description and claims, the term "WBA resins" includes intermediate resins.

Figure 2:
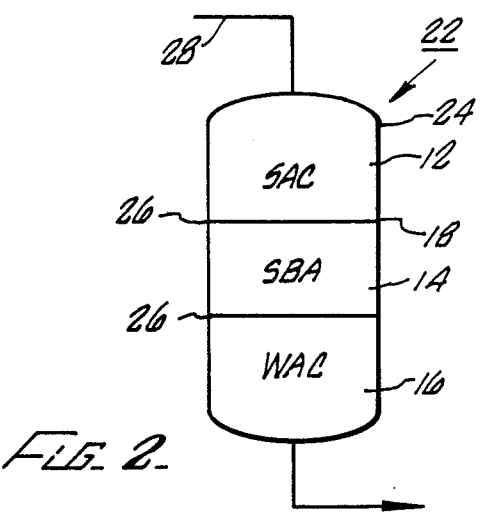
FIG. 2 is a schematic representation of a second water demineralization system embodying features of the present invention and capable of being employed as a condensate polisher.

Means 18 connect each resin zone 12, 14, and 16 so that water can pass sequentially through the system 10. An exemplary connector means 18 for use in connecting separately housed resin zones 12, 14, and 16 are conduits 20. In contrast, in a second demineralization system 22 embodying features of the present invention and also being capable of being employed to polish condensate, the resin zones 12, 14, and 16 are housed in a tower 24 as shown in FIG. 2. In this second system 22, the connector means 18 comprises plates or separators 26 which separate each zone 12, 14, and 16 that is housed in the tower 24 into discrete sections of the tower 24.

Because the SAC resin in the SAC resin zone 12 always (a) precedes and (b) is separated from the SBA resin in the SBA resin zone 14 in the condensate polishers 10 and 22, sulfonate leakage in the effluent from the condensate polishers 10 and 22 is reduced. In addition, because the SAC, SBA, and WAC resins are housed separately in resin zones 12, 14, and 16, respectively, the SAC, SBA, and WAC resins are not cross contaminated during the regeneration step. Furthermore, improved kinetics are exhibited by the condensate polishers 10 and 22 of the present invention.

The depth of the WAC resin in the WAC resin zone 16 is preferably from about 9 inches to about 48 inches. Below about 9 inches the contact time for satisfactory ion exchange is too short. Above about 48 inches the pressure drop across the WAC resin in the WAC resin zone 16 is undesirably high.

The depth of the resins in zones 12 and 14 is preferably from about 18 to about 42 inches. Below about 18 inches the resins in zones 12 and 14 tend to become exhausted too rapidly and above about 42 inches the pressure drop across the resin zones 12 and 14 is unacceptably high.

In the process of the present invention, water is sequentially passed through the sequential series of ion exchange resin zones. The condensate polisher systems 10 and 22 of FIGS. 1 and 2, respectively, preferably process water at a rate of about 20 to about 100 gallons per minute per square foot (gpmpsf) of resin zone cross sectional area. Below about a flow rate of about 20 gpmpsf, the system (a) can channel and (b) is uneconomical, and above a flow rate of about 100 gpmpsf, the condensate water cannot be satisfactorily polished. An exemplary condensate polishing rate is about 50 to about 70 gpmpsf. In addition, to avoid damaging any of the resins, the temperature of the influent water to the condensate polisher systems 10 and 22 is preferably below about 140° F.

The effluent water from the WAC resin zone 16 of either condensate polisher system 10 or 22 is capable of having sodium, chloride, and sulfate contents of less than about 1,000 parts per trillion (ppt) each and a conductivity of less than about 0.15 μS/cm at about 25° C. Because it is desirable to minimize the amount of dissolved matter in the effluent water, it is preferred that the effluent have a sodium, chloride, and sulfate content of less than about 100, and more preferably less than about 50, ppt each, and that the conductivity of the effluent be less than about 0.07 μS/cm at about 25° C.

The condensate polisher systems 10 and 22 of the present invention also are capable of yielding an effluent water having a reduced corrosion potential. This accomplishment is made possible because of the presence of the WAC resin in the WAC resin zone 16. First, the WAC resin does not split salts (e.g., NaCl) and therefore does not cause the formation of acids (e.g., HCl). Second, the corrosion potential of acidic water increases substantially while the corrosion potential of basic water initially increases at a lower rate. Accordingly, it is preferred to produce effluent water that has a substantially neutral to slightly alkaline pH. To achieve this result, the concentration of sodium in the effluent water from the last resin bed 16 is maintained at a level that is at least substantially equal to or greater than the combined concentration of chloride and sulfate present in the effluent water.

One way of achieving this result is to leave an amount of sodium on the regenerated WAC resin employed in the WAC resin zone 16 such that the amount of sodium leakage from the WAC resin in the WAC resin zone 16 is greater than or equal to the combined concentration of chloride and sulfate in the effluent water. An exemplary amount of sodium left on the regenerated WAC resin is less than about five percent of the theoretical binding capacity of the WAC resin. In general, the amount of sodium to be left on the WAC resin in the WAC resin zone 16 is inversely proportional to the amount of the WAC resin present in the WAC resin zone 16. Typically, the amount of such residual sodium can be less than about one percent of the theoretical binding capacity of the WAC resin. If the sodium content of the WAC resin is too low prior to regeneration to be capable of leaving the desired amount of sodium on the WAC resin after the regeneration step, the sodium content on WAC resin can be adjusted upward by adding caustic to the WAC resin before regeneration.

The various resins can be regenerated in situ or can be removed to separate regenerating stations (not shown). Removal to separate regeneration facilities provides increased efficiency and safety to plant equipment downstream since there is no danger of the regenerant being accidentally introduced into the cycle. A preferred technique for regenerating SAC and SBA resins is disclosed in U.S. Pat. No. 4,511,657, which is incorporated herein by reference.

An exemplary technique for cleaning the WAC resin in the WAC resin zone 16 comprises the following steps. First, the WAC resin is transferred from the WAC resin zone 16 to a regenerating station. Next, to loosen accumulated material, air is blown through the bottom of the WAC resin to provide agitation. The WAC resin is then backwashed in order to remove any suspended matter from the WAC resin and to classify the WAC resin. This backwash procedure also fluffs the WAC resin. Dilution water is then passed through the WAC resin and the chemical used to regenerate the WAC resin is gradually introduced to the dilution water. This sequential procedure safeguards against contacting the WAC resin with any concentrated regenerant.

The amount of regenerant used depends on the strength of the regenerant. In general, the amount of the regenerant employed is about a 20 percent excess of the theoretical amount required to displace substantially all of the cations from the WAC resin. Lower amounts can be used when increased sodium leakage is desired. The rate at which the regenerant is introduced into the WAC resin is dependent upon the regenerant being employed. In general, a flow rate of about 4 to about 8 bed volumes per hour is satisfactory. The temperature of the regenerant can be ambient or elevated. An elevated regenerant temperature of about 100° to about 130° F. can be used to improve the efficiency of the regeneration process.

The regenerant is displaced from the WAC resin with water at the same rate employed to introduce the regenerant into the WAC resin. Typically, about one to about 1.5 bed volumes of water are used to displace the regenerant. After the displacement water has been introduced, the flow of rinse water into the WAC resin is increased to a rate of about 16 bed volumes per hour. The increased flow rate of the rinse water is used to speed up the regeneration process. The rinse cycle is continued until a low conductivity is achieved. The final conductivity is dependent upon the particular WAC resin and regenerant employed. An exemplary conductivity is less than about 10 $\mu$S/cm at about 25° C. unless the final regenerant includes an amine in which case the conductivity will be less than about 100 $\mu$S/cm. After the WAC resin has been rinsed to the desired conductivity, the WAC resin is transferred to the WAC resin zone 16 and the WAC zone 16 is put back into service.

In order to minimize any halogen (e.g., chloride) and sulfate leakage from the WAC resin, it is preferred to employ an aqueous solution of a regenerant that is (a) substantially devoid of sulfur and halogen groups and (b) selected from the group consisting of (i) organic acids, (ii) inorganic acids, (iii) amine salts of (i) and (ii), (iv) amines, and (v) combinations thereof. The regenerant regenerates the WAC resin primarily from exhaustion due to sodium and ammonium ions. The amount of regenerant employed in the aqueous regenerating solution is less than about 10 weight percent of the solution.

Exemplary organic acids include, but are not limited to, aliphatic carboxylic acids (e.g., formic, acetic, and propionic acids), dicarboxylic acids (e.g., oxalic and malonic acids), hydroxy acids (glycolic, tartaric, and citric acids, carbonic and carbamic acids, and ethylenediaminetetraacetic acid. Exemplary inorganic acids include, but are not limited to, phosphoric, phosphorous, and hypo-boric acids. Exemplary amine salts include, but are not limited to, ammonium citrate, ammonium carbonate, and ammonium bicarbonate. Ammonium bicarbonate can optionally be formed in situ with carbon dioxide and ammonium hydroxide. The ammonium bicarbonate regenerated WAC resin can be used as is or the WAC regenerated resin can be contacted with carbonic acid to convert the WAC resin back to the hydrogen form. Exemplary amines include, but are not limited to morpholine and amino-2-methyl-2-propanol (AMP).

Figure 3:
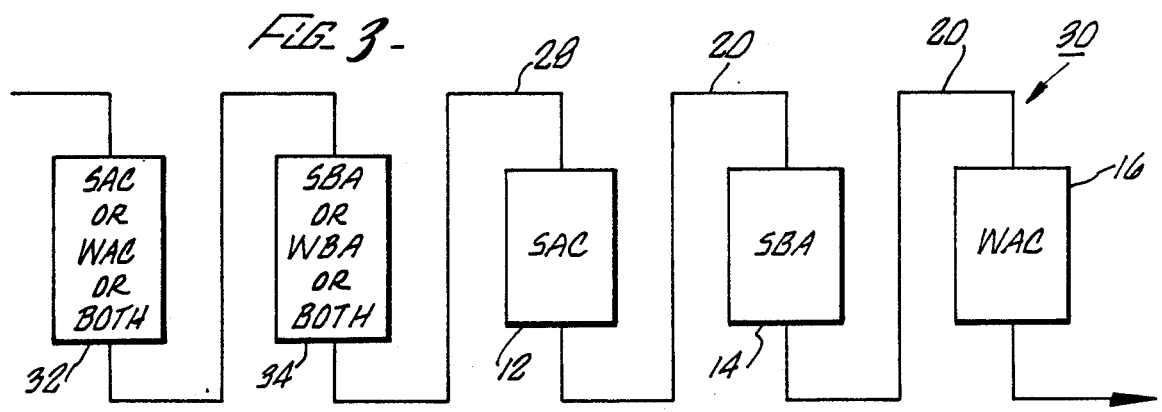
FIG. 3 is a schematic representation of a third water demineralization system embodying features of the present invention and capable of being employed as a make up demineralization system.

In addition to the embodiments of the invention discussed above, the water demineralizer system of the present invention can also be employed as a make up demineralizer system to demineralize water added to the power plant system to compensate or make up for water lost during the power plant's operation. For example, FIG. 3 shows a third demineralization system 30 Which embodies features of the present invention and which can serve as a make up demineralization system. The third demineralization system 30 comprises a primary cation resin zone 32 and a primary anion resin zone 34 sequentially preceding the SAC, SBA, and WAC resin zones 12, 14, and 16, respectively. In this configuration, the SAC, SBA, and WAC resin zones 12, 14, and 16, respectively, are employed to polish effluent water from the primary cation and primary anion resin zones 32 and 34, respectively, while the primary cation and primary anion resin zones 32 and 34 are employed as primary water demineralization zones. Resin zones used as a primary water demineralization zone have a larger cross-sectional area than resin zones used as water polishing zones. In addition, the depth of the resins in the primary water demineralization zones typically is deeper than the depth of the resins in the water polishing zones. An exemplary resin depth in the primary water demineralization zones is about three to about eight feet.

The primary cation resin zone 32 comprises a cation resin selected from the group consisting of SAC resins, WAC resins, and mixtures thereof, and the primary anion resin zone 34 comprising an anion resin selected from the group consisting of SBA resins, WBA resins, and mixtures thereof. In order to maximize the regeneration process, different types of resins (strong vs. weak) are preferably regenerated differently. Accordingly, to avoid problems with respect to separating resins, it is preferred that the cation resin employed in the primary cation resin zone 32 be either a SAC or a WAC resin but not a mixture of the two. For the same reason, it is preferred that the anion resin employed in the primary anion resin zone 34 be either a SBA or a WBA resin but not a mixture of the two. Furthermore, for improved kinetics, it is preferred that the cation resin used in the primary cation resin zone 32 be a SAC resin. This is because the SAC resin makes the influent to the primary anion resin zone 34 more acidic, thereby improving the kinetics in the primary anion resin zone 34.

Figure 4:
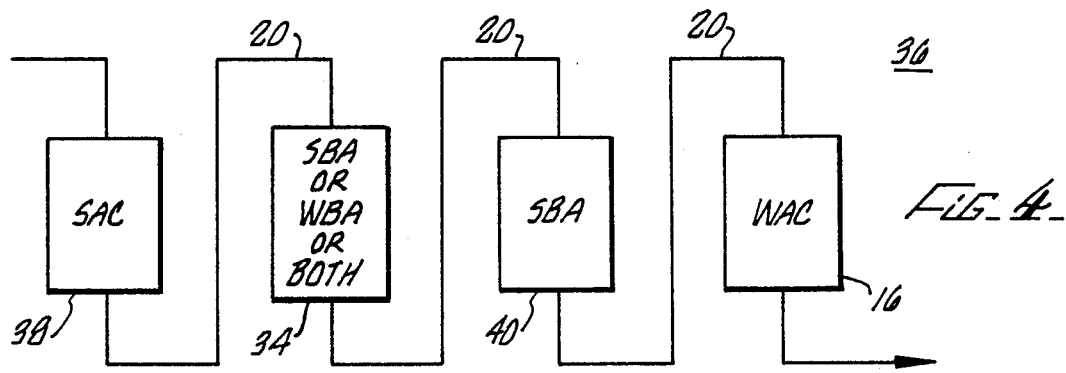
FIG. 4 is a schematic representation of a fourth water demineralization system embodying features of the present invention and capable of being employed as a make up demineralization system.

As shown in FIG. 4, a fourth demineralization system 36 embodying features of the present invention, and capable of use as make up demineralizer system, sequentially comprises a primary SAC resin zone 38, an anion resin zone 34, a SBA resin zone 40, and the WAC resin zone 16. The primary SAC resin zone 38 comprises a SAC resin and the SBA resin zone 40 comprises a SBA resin. When the anion resin zone 34 comprises an anion selected from the group consisting of WBA resins and mixtures of WBA and SBA resins, the anion resin zone 34 and the SBA resin zone 40 are primary water demineralization zones. However, when the anion resin zone 34 comprises a SBA resin, the anion resin zone 34 is a primary water demineralization zone while the SBA resin zone 40 is a water polishing zone. In either case, the primary SAC resin zone 38 is a primary water demineralization zone and the WAC resin zone 16 is water polishing resin zone. The resin zones 38, 34, 40, and 16 are sequentially connected by conduits 20.

Figure 5:
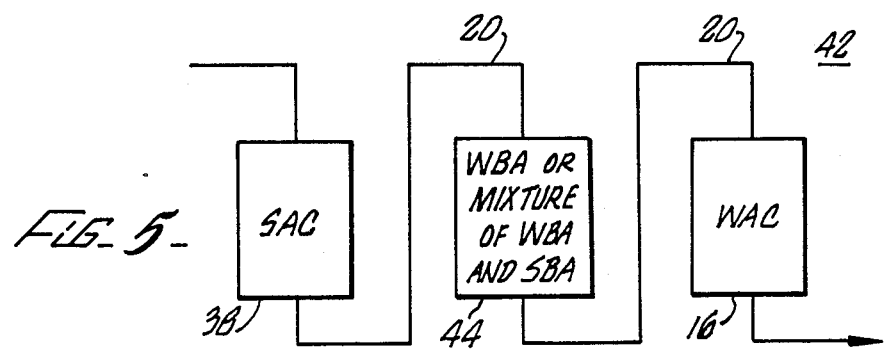
FIG. 5 is a schematic representation of a fifth water demineralization system embodying features of the present invention and capable of being employed as a make up demineralization system.

Similarly, FIG. 5 depicts a fifth system 42 which also embodies features of the present invention and which can also serve as a make up demineralization system. The fifth system 42 comprises the primary SAC resin zone 38, a primary anion resin zone 44, and the WAC resin zone 16. The primary anion resin zone 44 comprises an anion resin selected from the group consisting of WBA resins and mixtures of SBA and WBA resins. The primary SAC resin zone 38 and the primary anion resin zone 44 are primary water demineralization zones and the WAC resin zone 16 is a water polishing zone.

Typically, a power plant's demand for make up water is less than its demand for polished condensate. In general, tap water or water of comparable quality is treated by any one of make up demineralization systems 30, 36, or 42 at a rate of about 4 to about 15 gpmpsf in the primary zones and at a rate of about 15 to about 25 gpmpsf in the water polishing zones. Water leaving the last primary zone in the make up demineralization systems 30, 36, and 42 has a total dissolved solids content of less than about 10 ppm. Water leaving the WAC resin zone 16 of the make up demineralization systems 30, 36, and 42 has a sodium, chloride, and sulfate content of less than about 2 ppb each.

The systems and processes of the present invention are capable of producing water having a purity comparable to or better than that currently obtainable. In addition, the configuration of the present invention's condensate polisher system enables the resins employed in the system (a) to be regenerated without any cross contamination of the resins, (b) to be regenerated less frequently (for all but the SAC resin in SAC resin zone 12 which is exhausted primarily due to ammonium), and (c) to exhibit improved kinetics. Furthermore, the effluent water produced by the condensate polisher system of the present invention (a) possesses a low corrosion potential and (b) has a low sulfonate, chloride, and sulfate content. Also, the configuration of the present invention's make up demineralization system yields an effluent having a sodium, chloride, and sulfate level of below about 2 ppb each.

EXAMPLES

In these examples, the ability of the present invention's aqueous regenerating solution to regenerate a sodium exhausted WAC resin is demonstrated.

EXAMPLES 1-8

Regeneration of a WAC Resin With Different Aqueous Regenerating Solutions

A. Methodology

A WAC resin having a sodium (Na) capacity of about 41 meg/25 ml of WAC resin was placed substantially 100% in the sodium form. The Na exhausted WAC resin was regenerated with each aqueous regenerating solution listed in Table II at a rate of about 4 bed volumes of regenerating solution per hour (which is equivalent to about 0.5 gpm/ft$^3$).

The following procedure was then used to determine the efficiency of each aqueous regenerating solution. About 25 ml of the regenerated WAC resin was placed in a drying tube. About 250 ml of an approximately two percent (wt/wt) HCl solution was passed through the resin at a rate of about 3.3 ml/min. A rotameter was used to monitor the flow rate. After being treated with the HCl solution, the resin was rinsed with about 50 ml of deionized water at a rate of about 3.3 ml/min. The HCl effluent and the deionized water effluent from the WAC resin were collected in a 500 ml volumetric flask. The combined effluents were than diluted to volume. The amount of sodium removed by this HCl procedure was determined by atomic absorption. The results of these experiments are also listed in Table II.

TABLE II

| Ex. | Chemical | Concentration, % wt/wt | Volume/100 ml resin, ml | pH | Remaining Meq/25 ml of Sodium After Regeneration |
| --- | --- | --- | --- | --- | --- |
| 1 | (NH$_4$)$_2$CO$_3$ | 2.0 | 1,200 | 8.0 | 0.001 |
| 2 | NH$_4$HCO$_3$ | 3.3 | 1,200 | 8.1 | 0.001 |
| 3 | (NH$_4$)$_3$ Citrate | 2.0 | 1,200 | 7.9 | 0.001 |
| 4 | (NH$_4$)$_3$ Citrate | 3.4 | 1,200 | 8.0 | 0.001 |
| 5 | Citric Acid | 2.7 | 1,200 | 2.1 | 0.0001 |
| 6 | Citric Acid | 10 | 300 | 1.6 | 0.0003 |
| 7 | Acetic Acid | 1 | 3,000 | 2.8 | 0.0003 |
| 8 | Acetic Acid | 10 | 300 | 2.2 | 0.001 |

The data set forth in Table II demonstrate that aqueous regenerating solutions within the scope of the present invention can effectively regenerate a sodium exhausted WAC resin.

Although the present invention has been described in considerable detail with reference to certain preferred versions thereof, other versions are possible. For example, in addition to polishing condensate water, the polisher systems of FIGS. 1 and 2 can be employed to polish any water having a total dissolved solids content of less than about 10 ppm. Futhermore, it is possible to employ other primary water demineralization zone configurations in addition to those discussed herein. Therefore, in the spirit and scope of the appended claims should not necessarily be limited to the description of the preferred versions contained herein.

What is claimed is:

1. A process for demineralizing water for use in a system such as a power plant, the process comprising the sequential steps of:
   (a) passing the water through a strong acid cation resin zone comprising a strong acid cation resin for removing cations from water to yield a first effluent;
   (b) passing the first effluent through a first anion resin zone comprising an anion resin for removing anions from water to yield a second effluent;
   (c) passing the second effluent through a weak acid cation resin zone comprising a weak acid cation resin for removing cations from water without substantially splitting any salts present in the water to yield a third effluent; and
   (d) delivering the third effluent to the system without passing the third effluent through any additional ion exchange resin zones.

2. The process of claim 1 further comprising the sequential steps of:
   (i) passing the first effluent through a second anion resin zone to yield a second anion resin zone effluent; and
   (ii) passing the second anion resin zone effluent through the first anion resin zone to yeild the second effluent, the second anion resin zone comprising an anion resin for removing anions from water.

3. The process of claim 2 wherein the first anion resin zone comprises a strong base anion resin and the second anion resin zone comprises an anion resin selected from the group consisting of weak base anion resins and mixtures of weak base anion resins and strong base anion resins, the strong acid cation, second anion, and first anion resin zones being primary water demineralization zones and the weak acid cation zone being a water polishing zone.

4. The process of claim 2 wherein the first anion resin zone comprises a strong base anion resin and the second anion resin zone comprises a strong base anion resin, the strong acid cation and second anion resin zones being primary water demineralization zones and the first anion and weak acid cation resin zones being water polishing zones.

5. The process of claim 1 wherein the first anion resin zone comprises a strong base anion resin, and the strong acid cation, first anion, and weak acid cation resin zones are water polishing zones.

6. The process of claim 5 further comprising the sequential steps of:
(i) passing the water through a primary cation resin zone to yield a primary cation resin zone effluent;
(ii) passing the primary cation resin zone effluent through a primary anion resin zone to yield a primary anion resin zone effluent; and
(iii) passing the primary anion resin zone effluent through the strong acid cation resin zone to yield the first effluent, wherein the primary cation resin zone comprises a cation resin for removing cations from water and the primary anion resin zone comprises an anion resin for removing anions from water, the primary cation and primary anion resin zones being primary water demineralization zones.

7. The process of claim 1 wherein the first anion resin zone comprises an anion resin selected from the group consisting of weak base anion resins and mixtures of weak base anion and strong base anion resins, the strong acid cation resin and first anion resin zones being primary water demineralization zones and the weak acid cation resin zone being a water polishing zone.

8. The process of claim 1 wherein the water entering the strong acid cation resin zone has a total dissolved solids content greater than 50 ppb and the third effluent has a sodium content of less than about 1,000 parts per trillion (ppt), a chloride content of less than about 1,000 ppt, a sulfate content of less than 1,000 ppt, and a conductivity of less than 0.15 $\mu$S/cm at 25° C.

9. The process of claim 8 wherein the third effluent has a sodium content of less than about 100 ppt, a chloride content of less than about 100 ppt, and a sulfate content of less than about 100 ppt.

10. The process of claim 8 wherein the third effluent has a sodium content of less than about 50 ppt, a chloride content of less than about 50 ppt, a sulfate content of less than about 50 ppt, and conductivity of less than about 0.07 $\mu$S/cm at 25° C.

11. The process of claim 1 wherein the third effluent is maintained at a substantially neutral to slightly alkaline pH by the step of adjusting the amount of sodium in the third effluent such that the third effluent has a sodium concentration at least substantially equal to the combined concentration of chloride and sulfate therein.

12. The process of claim 11 further comprising the step of regenerating the weak acid cation resin so that an amount of sodium is left on the regenerated weak acid cation resin equal to less than about five percent of the theoretical binding capacity of the weak acid cation resin whereby the regenerated weak acid cation resin is capable of leaking sodium into the third effluent.

13. The process of claim 1 wherein the third effluent is maintained at a substantially neutral to slightly alkaline pH by the step of adjusting the amount of sodium in the third effluent such that the third effluent has a sodium concentration greater than the combined concentration of chloride and sulfate therein.

14. The process of claim 1 wherein the water is obtained from the system.

15. The process of claim 1 further comprising the step of regenerating the weak acid cation resins from sodium and ammonium fouling by contacting the weak acid cation resin with an aqueous solution of a regenerant selected from the group consisting of (a) organic acids, (b) inorganic acids, (c) amine salts of (a) and (b), (d) amines, and (e) combinations thereof, the regenerant being substantially devoid of sulfur and halogen groups.

16. The process of claim 15 wherein the regenerant is selected from the group consisting of organic acids, their amine salts, and combinations thereof.

17. The process of claim 16 wherein the regenerant is selected from the group consisting of aliphatic carboxylic acids, dicarboxylic acids, hydroxy acids, carbonic acids, carbamic acids, ethylenediaminetetraacidic acid, phosphoric acid, phosphorous acid, hypo-boric acid, their amine salts and combinations thereof.

18. The process of claim 17 wherein the regenerant is citric acid.

19. The process of claim 17 wherein the regenerant is acetic acid.

20. The process of claim 17 wherein the regenerant is ammonium citrate.

21. The process of claim 17 wherein the regenerant is ammonium carbonate.

22. The process of claim 17 wherein the regenerant is ammonium bicarbonate.

23. The process of claim 22 wherein the regenerant is ammonium bicarbonate, the process further comprising the step of forming the ammonium bicarbonate by reacting carbon dioxide and ammonium hydroxide.

24. The process of claim 23 further comprising the step of contacting the ammonium bicarbonate regenerated resin with carbonic acid for converting the ammonium bicarbonate regenerated resin into the hydrogen form.

25. The process of claim 15 wherein the regenerant is an amine.

26. The process of claim 25 wherein the regenerant is selected from the group consisting of morpholine, amino-2-methyl-2-propanol, and mixtures thereof.

27. The process of claim 15 wherein the regenerant is selected from the group consisting of inorganic acids, their amine salts, and combinations thereof.

28. The process of claim 15 wherein the amount of sodium left on the regenerated weak acid cation resin is less than about 5 percent of the theoretical binding capacity of the weak acid cation resin.

29. The process of claim 15 wherein the amount of sodium left on the regenerated weak cation resin is less than about 1 percent of the theoretical binding capacity of the weak acid cation resin.

30. The process of claim 15 wherein the regenerant comprises up to about 10 weight percent of the aqueous solution.

31. The process of claim 1 wherein the water entering the strong acid cation resin zone has a total dissolved solids content greater than 50 ppb, the first anion resin zone comprises a strong base anion resin; and the third effluent has a sodium, chloride and sulfate content of less than about 1 ppb each.

32. The process of claim 1 wherein the water entering the strong acid cation resin zone has a total dissolved solids content level greater than 10 parts per million (ppm); the first anion resin zone comprises an anion resin selected from the group consisting of weak base anion and strong base anion resins; the second effluent has a dissolved content of below 10 ppm; and the third effluent has a sodium, chloride, and sulfate content of less than about 2 ppb each.

33. The process of claim 1 wherein the water entering the strong acid cation resin zone has a total dissolved solids content level greater than 10 parts per million (ppm); the first anion resin zone comprises a strong base anion resin; and the process further comprises the sequential steps of:
   (i) passing the first effluent through a second anion resin zone comprising an anion resin to yield a second anion resin zone effluent; and
   (ii) passing the second anion resin zone effluent through the first anion resin zone to yield the second effluent.

34. The process of claim 33 wherein the second anion resin zone comprises an anion resin selected from the group consisting of weak base anion resins and mixtures of weak and strong base anion resins; the second effluent has a total dissolved solids content of less than 10 parts per million; and the third effluent has a sodium, chloride, and sulfate content of less than about 2 ppb each.

35. The process of claim 33 wherein the second anion resin zone comprises a strong base anion resin; the second anion resin zone effluent has a total dissolved solids content of less than 10 parts per million, and the third effluent has a sodium, chloride and sulfate content of less than about 2 ppb each.

36. The process of claim 1 wherein the first anion resin zone comprises a strong base anion resin and the process further comprises the sequential steps of:
   (i) passing the water through a primary cation resin zone comprising a cation resin to yield a primary cation resin zone effluent;
   (ii) passing the primary cation resin zone effluent through a primary anion resin zone comprising an anion resin to yield a primary anion resin zone effluent; and
   (iii) passing the primary anion resin zone effluent through the strong acid cation resin zone to yield the first effluent;
the water entering the primary cation resin zone having a total dissolved solids content level greater than 10 parts per million (ppm); the primary anion resin zone effluent having a total dissolved solids content of less than 10 parts per million; and the third effluent having a sodium, chloride, and sulfate content of less than about 2 ppb each.

37. A process for polishing water comprising the sequential steps of:
   (a) passing the water through a strong acid cation resin zone comprising a strong acid cation resin for removing cations from water to yield a first effluent;
   (b) passing the first effluent through a first anion resin zone comprising a strong base anion resin for removing anions from water to yield a second effluent; and
   (c) passing the second effluent through a weak acid cation resin zone comprising a weak acid cation resin for removing cations from the water without substantially splitting any salts present in the water to yield a third effluent.

38. The process of claim 37 wherein the first anion resin zone further comprises a weak base anion resin.

39. The process of claim 37 further comprising the sequential steps of:
   (i) passing the first effluent through a second anion resin zone comprising an anion resin to yield a second anion resin zone effluent; and
   (ii) passing the second anion resin zone effluent through the first anion resin zone to yield the second effluent.

40. The process of claim 37 further comprising the sequential steps of:
   (i) passing the water through a primary cation resin zone comprising a cation resin to yield a primary cation resin zone effluent;
   (ii) passing the primary cation resin zone effluent through a primary anion resin zone comprising an anion resin to yield a primary anion resin zone effluent; and
   (iii) passing the primary anion resin zone effluent through the strong acid cation resin zone to yield the first effluent.

* * * * *